(12) United States Patent
Seo et al.

(10) Patent No.: US 10,135,597 B2
(45) Date of Patent: *Nov. 20, 2018

(54) METHOD AND DEVICE FOR TRANSMITTING ACK/NACK IN WIRELESS COMMUNICATION SYSTEM

(71) Applicant: LG ELECTRONICS INC., Seoul (KR)

(72) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,141

(22) Filed: Sep. 28, 2017

(65) Prior Publication Data

US 2018/0034614 A1 Feb. 1, 2018

Related U.S. Application Data

(63) Continuation of application No. 14/855,806, filed on Sep. 16, 2015, now Pat. No. 9,813,215, which is a (Continued)

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1607* (2013.01); *H04L 1/1854* (2013.01); *H04L 5/14* (2013.01); *H04L 5/26* (2013.01)

(58) Field of Classification Search
CPC ....... H04L 5/0055; H04L 1/1854; H04L 5/14; H04L 1/1607; H04L 1/02; H04L 1/06;
(Continued)

(56) References Cited

U.S. PATENT DOCUMENTS 9,172,519 B2 10/2015 Seo .................. H04L 1/1607
9,813,215 B2 * 11/2017 Seo .................. H04L 5/0055
(Continued)

FOREIGN PATENT DOCUMENTS

CN 101958778 A 1/2011
CN 101989898 A 3/2011
WO 2009-120797 A1 10/2009

OTHER PUBLICATIONS

R1-105111—3GPP TSG-RAN Meeting #62, Madrid, Spain, Aug. 23-27, 2010.
(Continued)

*Primary Examiner* — Benjamin H Elliott, IV
(74) *Attorney, Agent, or Firm* — Dentons US LLP

(57) ABSTRACT

Provided are a method and a device for transmitting an acknowledgement/not-acknowledgement (ACK/NACK) of a terminal which is set with a plurality of serving cells. The method comprises the steps of: receiving data in a subframe n of a second serving cell; and transmitting an ACK/NACK signal for the data in a subframe $n+k_{SCC}(n)$ of a first serving cell connected to the subframe n of the second serving cell, wherein the first serving cell is a primary cell for the terminal to execute an initial connection establishment procedure or a connection reestablishment procedure, and uses a frequency division duplex (FDD) wireless frame, the second serving cell is a secondary cell allocated to the terminal in addition to the primary cell, and uses a time division duplex (TDD) wireless frame, and the $k_{SCC}(n)$ is a previously determined value.

8 Claims, 15 Drawing Sheets

Related U.S. Application Data continuation of application No. 14/004,795, filed as application No. PCT/KR2012/001841 on Mar. 14, 2012, now Pat. No. 9,172,519.

(60) Provisional application No. 61/467,387, filed on Mar. 25, 2011, provisional application No. 61/452,164, filed on Mar. 14, 2011.

(51) Int. Cl.
*H04L 5/14* (2006.01)
*H04L 1/18* (2006.01)
*H04L 5/26* (2006.01)

(58) Field of Classification Search
CPC . H04L 1/08; H04L 1/16; H04L 1/1621; H04L 1/1628; H04L 1/1635; H04L 1/18; H04L 1/1809; H04L 5/00; H04L 5/0001; H04L 5/0003; H04L 5/0005; H04L 5/003; H04L 5/0091; H04L 5/0092
See application file for complete search history.

(56) References Cited

U.S. PATENT DOCUMENTS

| | | | |
|---|---|---|---|
| 2007/0183432 A1 | 8/2007 | Kim et al. | 370/400 |
| 2007/0286226 A1 | 12/2007 | Yoon et al. | 370/445 |
| 2009/0245212 A1 | 10/2009 | Sambhwani et al. | 370/336 |
| 2014/0161002 A1 | 6/2014 | Gauvreau | H04W 16/24 370/280 |
| 2016/0006552 A1 | 1/2016 | Seo | H04L 1/1607 370/280 |
| 2018/0034614 A1* | 2/2018 | Seo | H04L 5/26 |

OTHER PUBLICATIONS

R1-105153—3GPP TSG RAN WG1 Meeting #62bis, Xi'an, China, Oct. 11-15, 2010.
R1-106099—3GP TSG RAN WG1 Meeting #63, Jacksonville, USA, Nov. 15-19, 2010.
R1-104171—3GPP TSG RAN WG1 Meeting #1-bis, Dresden, Germany, Jun. 28 Jul. 2, 2010.
R1-091599—3GPP TSG-RAN WG1 #56bis, Seoul, South Korea, Mar. 23-Mar. 2009.
3GPP TSG-RAN WGI #56bis, R1-091204, "UL control channel design to support carrier aggregation", LG Electronics, Mar. 23-27, 2009 (see pp. 2-3).
3GPP TSG-RAN WG1 Meeting #54bis, R1-083730, "L1 control signaling with carrier aggregation in LTE-Advanced", Nokia, Nokia Siemens Networks, Sep. 29-Oct. 3, 2008 (see pp. 4-5).

\* cited by examiner

METHOD AND DEVICE FOR TRANSMITTING ACK/NACK IN WIRELESS COMMUNICATION SYSTEM

This application is a Continuation of U.S. patent application Ser. No. 14/855,806 filed Sep. 16, 2015, which is a Continuation of U.S. patent application Ser. No. 14/004,795 filed Dec. 5, 2013, now U.S. Pat. No. 9,172,519, which is a National Stage Application of International Application No. PCT/KR2012/001841 filed Mar. 14, 2012, which claims the benefit of U.S. Provisional Application No. 61/452,164 filed Mar. 14, 2011 and U.S. Provisional Application No. 61/467,387 filed Mar. 25, 2011, all of which are incorporated by reference for all purposes as if fully set forth herein.

BACKGROUND OF THE INVENTION

Field of the Invention

The present invention relates to wireless communication and, more particularly, to a method and apparatus for transmitting reception acknowledgement for a Hybrid Automatic Repeat reQuest (HARQ) in a wireless communication system in which serving cells using different types of radio frames are aggregated.

Related Art

Long Term Evolution (LTE) based on $3^{rd}$ Generation Partnership Project (3GPP) Technical Specification (TS) Release 8 is the leading next-generation mobile communication standard.

As disclosed in 3GPP TS 36.211 V8.7.0 (2009-05) "Evolved Universal Terrestrial Radio Access (E-UTRA); Physical Channels and Modulation (Release 8)", in LTE, a physical channel can be divided into a Physical Downlink Shared Channel (PDSCH) and a Physical Downlink Control Channel (PDCCH), that is, downlink channels, and a Physical Uplink Shared Channel (PUSCH) and a Physical Uplink Control Channel (PUSCH), that is, uplink channels.

A PUCCH is an uplink control channel used to send uplink control information, such as a Hybrid Automatic Repeat reQuest (HARQ), an acknowledgement/not-acknowledgement (ACK/NACK) signal, a Channel Quality Indicator (CQI), and a Scheduling Request (SR).

Meanwhile, 3GPP LTE-Advanced (A) that is the evolution of 3GPP LTE is in progress. Technology introduced into 3GPP LTE-A includes a carrier aggregation.

A carrier aggregation uses a plurality of component carriers. A component carrier is defined by the center frequency and a bandwidth. One downlink component carrier or a pair of an uplink component carrier and a downlink component carrier correspond to one cell. It can be said that a terminal being served using a plurality of downlink component carriers is being served from a plurality of serving cells.

In a Time Division Duplex (TDD) system, the same frequency is used in uplink and downlink. Accordingly, one or more DL subframes are associated with an UL subframe. The "association" means that transmission/reception in the DL subframe is associated with transmission/reception in the UL subframe. For example, when a transport block is received in a plurality of DL subframes, a terminal sends HARQ ACK/NACK (hereinafter referred to as ACK/NACK) for the transport block in an UL subframe associated with a plurality of DL subframes. Here, a minimum time is necessary to send the ACK/NACK. This is because the time taken to process the transport block and the time taken to process the ACK/NACK are necessary.

In a Frequency Division Duplex (FDD) system, different frequencies are used in uplink and downlink. An UL subframe and a DL subframe have a 1:1 relationship. In this case, ACK/NACK for a transport block received in a DL subframe is transmitted in an UL subframe after four subframes.

Meanwhile, in the next-generation wireless communication system, a serving cell using TDD and a serving cell using FDD can be aggregated. That is, a plurality of serving cells using different types of radio frames can be allocated to a terminal. In this case, whether ACK/NACK will be transmitted using what method is problematic.

SUMMARY OF THE INVENTION

An object of the present invention is to provide method and apparatus for transmitting ACK/NACK in a wireless communication system in which a plurality of serving cells using different types of radio frames is aggregated.

In one aspect, There is provided an acknowledgement/not-acknowledgement (ACK/NACK) transmission method of UE in which a plurality of serving cells has been configured. The method includes the steps of receiving data in a subframe n of a second serving cell and sending an ACK/NACK signal for the data in a subframe $n+k_{SCC}(n)$ of a first serving cell which is associated with the subframe n of the second serving cell, wherein the first serving cell is a primary cell in which the UE performs an initial connection establishment procedure or connection re-establishment procedure with a base station, the first serving cell uses a Frequency Division Duplex (FDD) radio frame, the second serving cell is a secondary cell additionally allocated to the UE in addition to the primary cell, the second serving cell uses a Time Division Duplex (TDD) radio frame, and the $k_{SCC}(n)$ is a predetermined value.

The $k_{SCC}(n)$ is a value identical with ACK/NACK timing in the first serving cell and may be four subframes.

The method further includes the steps of receiving data in a subframe n of the first serving cell and sending an ACK/NACK signal in the subframe $n+k_{PCC}(n)$ of the first serving cell which is associated with the subframe n of the first serving cell. The subframe $n+k_{PCC}(n)$ may be an uplink subframe spaced apart from the subframe n of the first serving cell by four subframes.

The method further includes the steps of receiving a first downlink grant for the data, received in the subframe n of the first serving cell, in the first serving cell and receiving a second downlink grant for the data received in the subframe n of the second serving cell, in the first serving cell. The number of bits of the first downlink grant may be the same as that of the second downlink grant.

The method further includes the step of receiving uplink (UL)-downlink (DL) configuration information about the TDD radio frame used in the second serving cell through the first serving cell.

The method further includes the steps of receiving data in a subframe n of a third serving cell and sending an ACK/NACK signal for data, received in the third serving cell, in the subframe $k_{SCC}(n)$ of the first serving cell which is associated with the subframe n of the third serving cell. The third serving cell is a secondary cell additionally allocated to the UE in addition to the primary cell, and the third serving cell may use a TDD radio frame.

In another aspect, There is provided an ACK/NACK transmission method of UE in which a plurality of serving cells has been configured. The method includes the steps of receiving data in a subframe n−k of a second serving cell and sending an ACK/NACK signal for the data in a subframe n of a first serving cell which is associated with the subframe n−k of the second serving cell, wherein the first serving cell is a primary cell in which the UE performs an initial connection establishment procedure or connection re-establishment procedure with a base station, the first serving cell uses a Frequency Division Duplex (FDD) radio frame, the second serving cell is a secondary cell additionally allocated to the UE in addition to the primary cell, the second serving cell uses a Time Division Duplex (TDD) radio frame, and in the subframe n−k, the k is determined to be a value identical with ACK/NACK timing of the second serving cell.

The method may further include the step of receiving UL-DL configuration information about the TDD radio frame used in the second serving cell through the first serving cell.

The method may further include the steps of receiving data in a subframe n−k of a third serving cell and sending an ACK/NACK signal for the data in the subframe n of the first serving cell which is associated with the subframe n−k of the third serving cell. The third serving cell is a secondary cell additionally allocated to the UE in addition to the primary cell, and the third serving cell may use a TDD radio frame.

In yet another aspect, there is provided UE. The UE include a Radio Frequency (RF) unit sending and receiving radio signals and a processor connected to the RF unit, wherein the processor receives data in a subframe n of a second serving cell and sends an ACK/NACK signal for the data in a subframe $n+k_{SCC}(n)$ of a first serving cell which is associated with the subframe n of the second serving cell, the first serving cell is a primary cell in which the UE performs an initial connection establishment procedure or connection re-establishment procedure with a base station, the first serving cell uses a Frequency Division Duplex (FDD) radio frame, the second serving cell is a secondary cell additionally allocated in addition to the primary cell, the second serving cell uses a Time Division Duplex (TDD) radio frame, and the $k_{SCC}(n)$ is a predetermined value.

ACK/NACK transmission timing for a terminal that operates in a wireless communication system in which a plurality of serving cells using different types of radio frames is aggregated is guaranteed in accordance with the present invention. Accordingly, system performance is improved.

DESCRIPTION OF EXEMPLARY EMBODIMENTS

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another tem, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
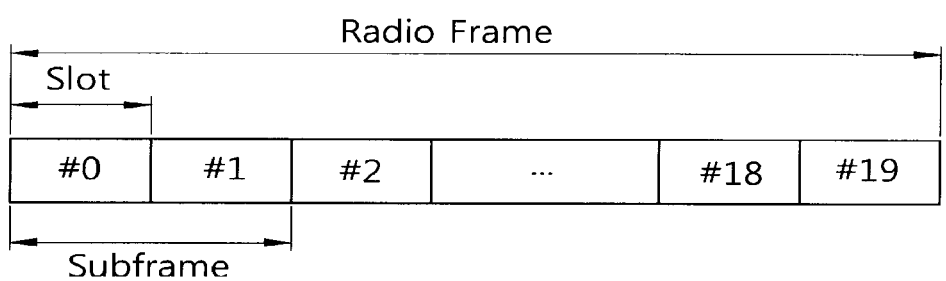
FIG. 1 shows the structure of an FDD radio frame.

FIG. 1 shows the structure of an FDD radio frame.

The FDD radio frame includes 10 subframes, and one subframe includes two consecutive slots. The slots within the radio frame are assigned indices 0-19. The time that is taken for one subframe to be transmitted is called a Transmission Time Interval (TTI). A TTI can be a minimum scheduling unit. For example, the length of one subframe can be 1 ms, and the length of one slot can be 0.5 ms.

Figure 2:
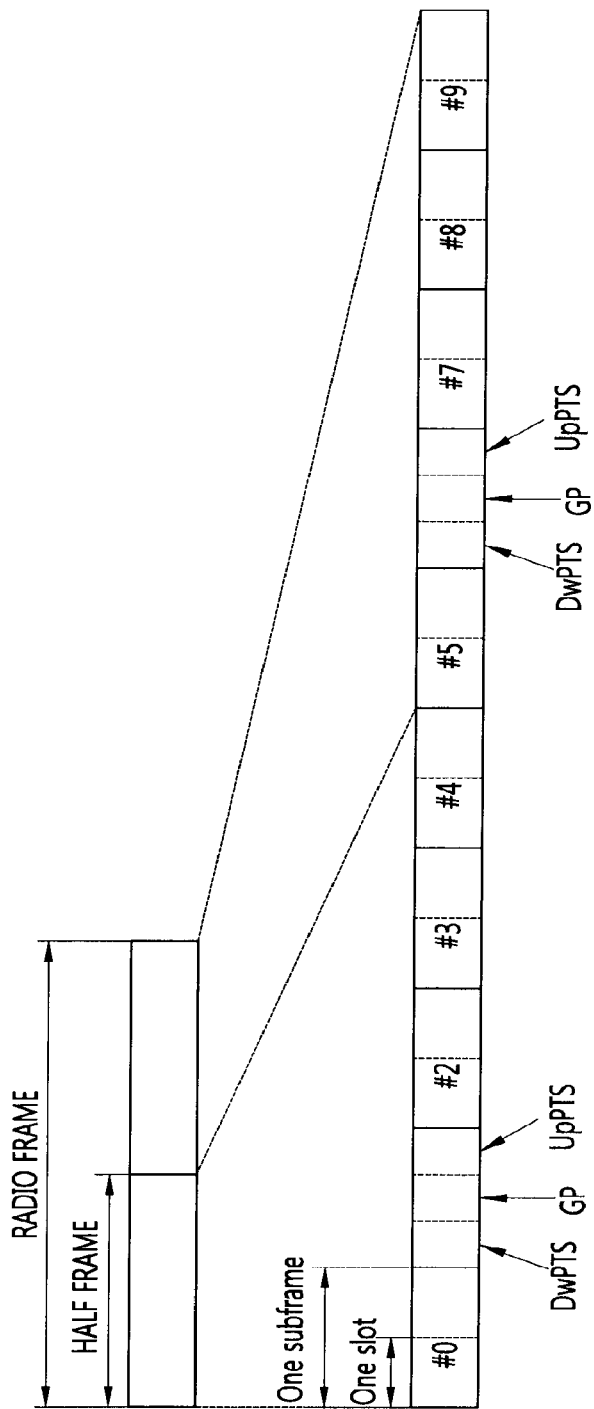
FIG. 2 shows the structure of a TDD radio frame.

FIG. 2 shows the structure of a TDD radio frame.

Referring to FIG. 2, subframes having an index #1 and an index #6 are called special subframes, and the subframe includes a Downlink Pilot Time Slot (DwPTS), a Guard Period (GP), and an Uplink Pilot Time Slot (UpPTS). The DwPTS is used in initial cell search, synchronization, or channel estimation in UE. The UpPTS is used for channel estimation in a BS and for the uplink transmission synchronization of UE. The GP is an interval in which interference occurring in UL due to the multi-path delay of a DL signal between UL and DL is removed.

In TDD, a downlink (DL) subframe and an uplink (UL) subframe coexist in one radio frame. Table 1 shows an example of the UL-DL configuration of a radio frame.

TABLE 1

| UL-DL configuration | DL-to-UL switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| UL-DL configu- ration | DL-to-UL switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

In Table 1, 'D' indicates a DL subframe, 'U' indicates an UL subframe, and 'S' indicates a special subframe. When an UL-DL configuration is received from a BS, UE can be aware whether each subframe in a radio frame is a DL subframe or an UL subframe. Hereinafter, reference can be made to Table 1 for an UL-DL configuration N (N is any one of 0 to 6).

Figure 3:
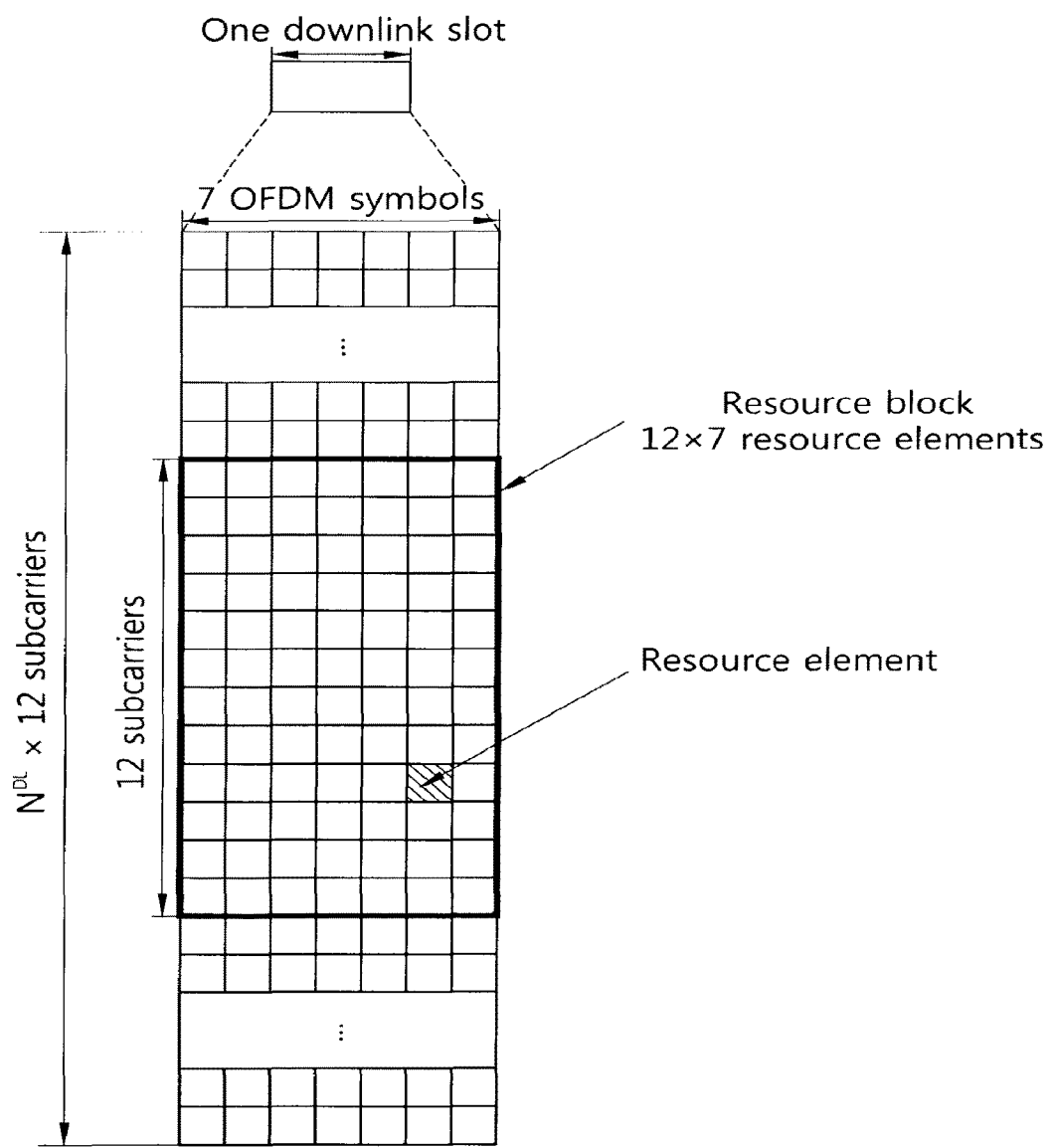
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth $N^{DL}$ configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, . . . , $N_{RB} \times 12-1$) is a subcarrier index within the frequency domain, and l (l=0, . . . , 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
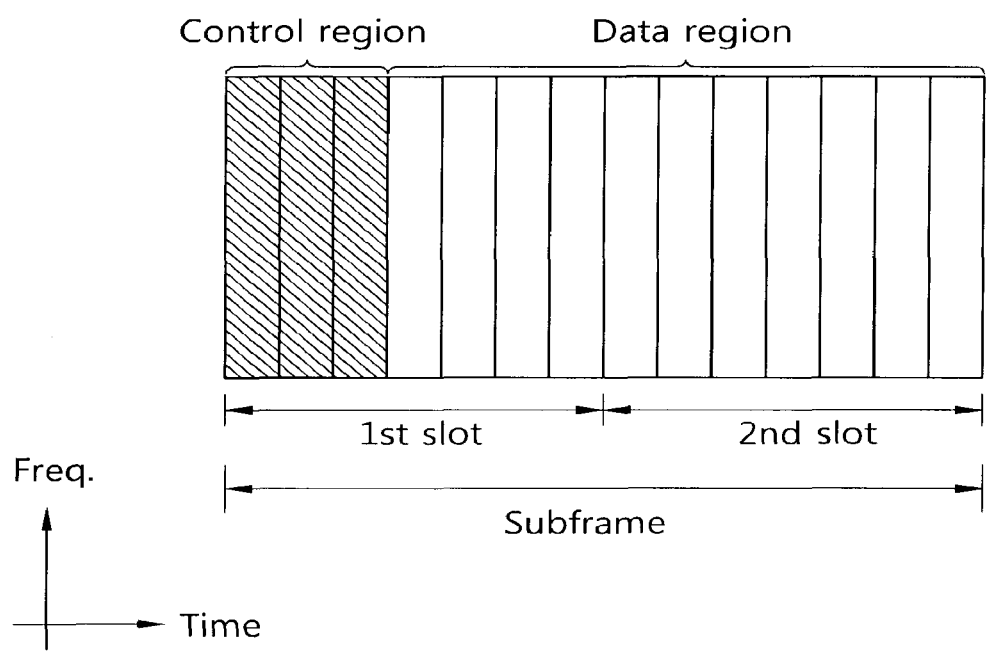
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (maximum 4 according to circumstances) OFDM symbols of a first slot within a subframe, but the number of OFDM symbols included in the control region can be changed. A control channel different from a physical downlink control channel (PDCCH) is allocated to the control region, and a physical downlink shared channel (PDSCH) is allocated to the data region.

As disclosed in 3GPP TS 36.211 V8.7.0, in 3GPP LTE, physical channels can be divided into a physical downlink shared channel (PDSCH) and a physical uplink shared channel (PUSCH), that is, data channels, and a physical downlink control channel (PDCCH), a physical control format indicator channel (PCFICH), a physical hybrid-ARQ indicator channel (PHICH), and a physical uplink control channel (PUSCH), that is, control channels.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

A physical broadcast channel (PBCH) is transmitted in the former 4 OFDM symbols of a second slot within the first subframe of a radio frame. The PBCH carries system information that is essential for UE to communicate with a BS, and system information transmitted through a PBCH is called a Master Information Block (MIB). In contrast, system information transmitted on a PDSCH indicated by a PDCCH is called a System Information Block (SIB).

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP).

Figure 5:
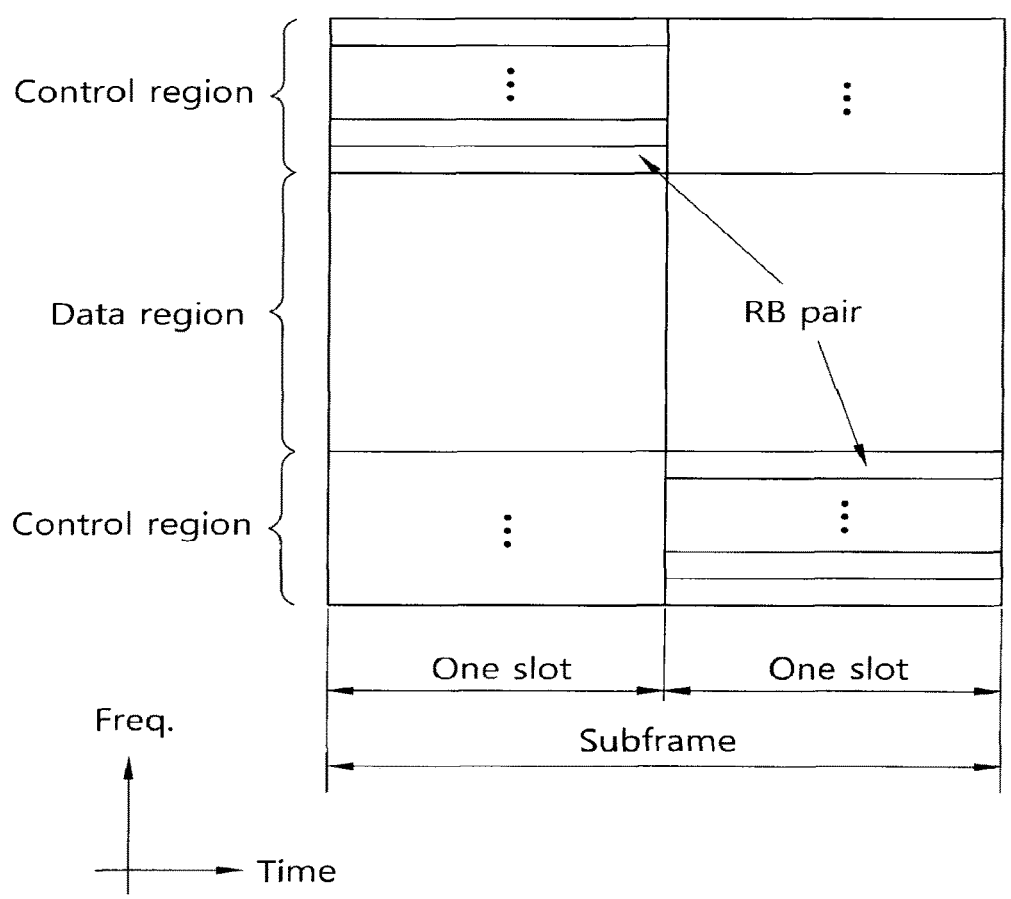
FIG. 5 shows the structure of an UL subframe.

FIG. 5 shows the structure of an UL subframe.

Referring to FIG. 5, the UL subframe can be divided into a control region to which a physical uplink control channel (PUSCH) for carrying uplink control information is allocated and a data region to which a physical uplink shared channel (PUSCH) for carrying user data is allocated in the frequency domain.

A PUCCH is allocated with an RB pair in a subframe. RBs that belong to an RB pair occupy different subcarriers in a first slot and a second slot. An RB pair has the same RB index m.

In accordance with 3GPP TS 36.211 V8.7.0, a PUCCH supports multiple formats. A PUCCH having a different number of bits in each subframe can be used according to a modulation scheme that is dependent on a PUCCH format.

Table 2 below shows an example of modulation schemes and the number of bits per subframe according to PUCCH formats.

TABLE 2

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used to send a Scheduling Request (SR), the PUCCH formats 1a/1b are used to send an ACK/NACK signal for an HARQ, the PUCCH format 2 is used to send a CQI, and the PUCCH formats 2a/2b are used to send a CQI and an ACK/NACK signal at the same time. When only an ACK/NACK signal is transmitted in a subframe, the PUCCH formats 1a/1b are used. When only an SR is transmitted, the PUCCH format 1 is used. When an SR and an ACK/NACK signal are transmitted at the same time, the PUCCH format 1 is used. The ACK/NACK signal is modulated into resources allocated to the SR and is then transmitted.

All the PUCCH formats use the Cyclic Shift (CS) of a sequence in each OFDM symbol. A CS sequence is generated by cyclically shifting a base sequence by a specific CS amount. The specific CS amount is indicated by a CS index.

An example in which a base sequence $r_u(n)$ has been defined is the same as the following equation.

$$r_u(n) = e^{jb(n)\pi/4} \quad \text{[Equation 1]}$$

Here, u is a root index, n is an element index wherein $0 \leq n \leq N-1$, and N is the length of the base sequence. b(n) is defined in section 5.5 of 3GPP TS 36.211 V8.7.0.

The length of a sequence is the same as the number of elements included in the sequence. U can be determined by a cell identifier (ID), a slot number within a radio frame, etc. Assuming that a base sequence is mapped to one resource block in the frequency domain, the length N of the base sequence becomes 12 because one resource block includes 12 subcarriers. A different base sequence is defined depending on a different root index.

A CS sequence $r(n, I_{cs})$ can be generated by cyclically shifting the base sequence r(n) as in Equation 2.

$$r(n, I_{cs}) = r(n) \cdot \exp\left(\frac{j2\pi I_{cs} n}{N}\right), \quad 0 \leq I_{cs} \leq N-1 \quad \text{[Equation 2]}$$

Here, $I_{cs}$ is a CS index indicative of a CS amount ($0 \leq I_{cs} \leq N-1$).

An available CS index of a base sequence refers to a CS index that can be derived from the base sequence according to a CS interval. For example, the length of a base sequence is 12 and a CS interval is 1, a total number of available CS indices of the base sequence becomes 12. Or, if the length of a base sequence is 12 and a CS interval is 2, a total number of available CS indices of the base sequence becomes 6.

Figure 6:
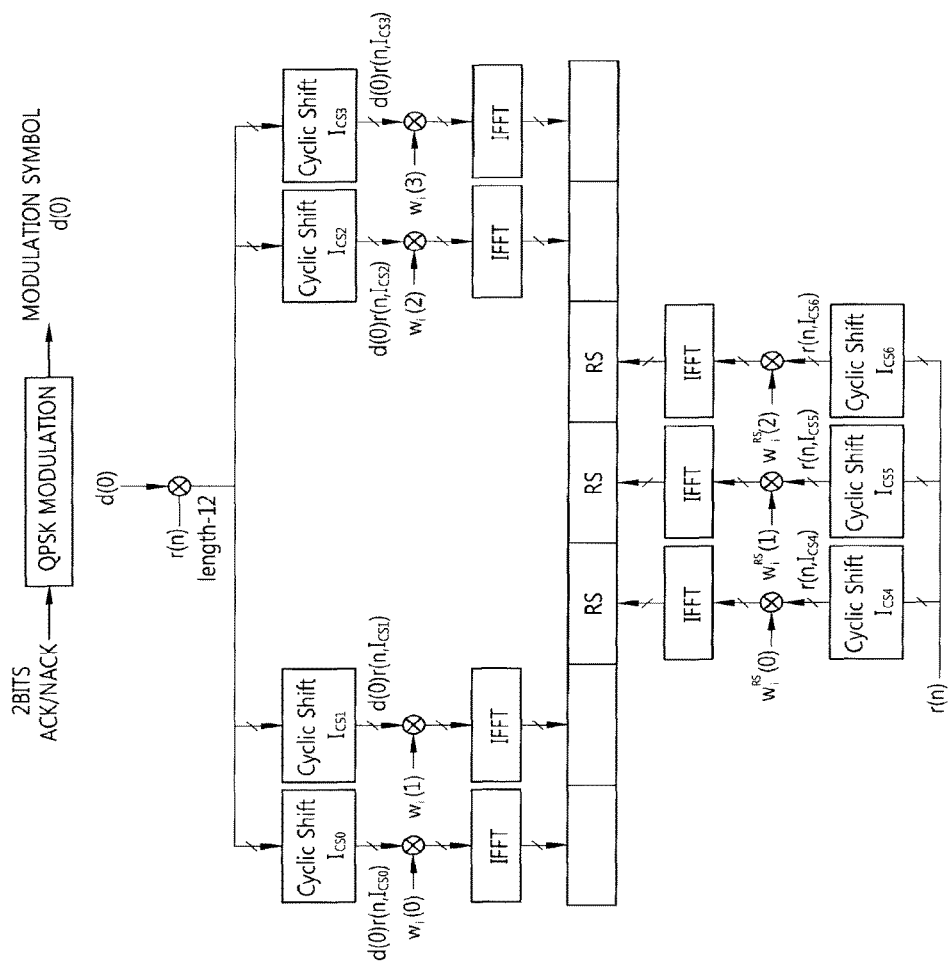
FIG. 6 shows the channel structure of a PUCCH format 1b in a normal CP.

FIG. 6 shows the channel structure of the PUCCH format 1b in a normal CP.

One slot includes 7 OFDM symbols, the 3 OFDM symbols become Reference Signal (RS) OFDM symbols for a reference signal, and the 4 OFDM symbols become data OFDM symbols for an ACK/NACK signal.

In the PUCCH format 1b, a modulation symbol d(0) is generated by performing Quadrature Phase Shift Keying (QPSK) modulation on an encoded 2-bit ACK/NACK signal.

A CS index $I_{cs}$ can vary depending on a slot number 'ns' within a radio frame and/or a symbol index 'l' within a slot.

In a normal CP, 4 data OFDM symbols for sending an ACK/NACK signal are present in one slot. It is assumed that corresponding CS indices in respective data OFDM symbols are $I_{cs0}$, $I_{cs1}$, $I_{cs2}$, and $I_{cs3}$.

The modulation symbol d(0) is spread into a CS sequence r(n,Ics). Assuming that a 1-dimensional spread sequence corresponding to an $(i+1)^{th}$ OFDM symbol is m(i) in a slot, $\{m(0), m(1), m(2), m(3)\} = \{d(0)r(n,I_{cs0}), d(0)r(n,I_{cs1}), d(0)r(n,I_{cs2}), d(0)r(n,I_{cs3})\}$ can be obtained.

In order to increase a UE capacity, the 1-dimensional spread sequence can be spread using an orthogonal sequence. The following sequence is used as an orthogonal sequence $w_i(k)$ (i is a sequence index, $0 \leq k \leq K-1$) wherein a spreading factor K=4.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

The following sequence is used as an orthogonal sequence $w_i(k)$ (i is a sequence index, $0 \leq k \leq K-1$) wherein a spreading factor K=3.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spreading factor can be used in each slot.

Accordingly, assuming that a specific orthogonal sequence index i is given, 2-dimensional spread sequences $\{s(0), s(1), s(2), s(3)\}$ can be expressed as follows.

$$\{s(0), s(1), s(2), s(3)\} = \{w_i(0)m(0), w_i(1)m(1), w_i(2)m(2), w_i(3)m(3)\}$$

The 2-dimensional spread sequences $\{s(0), s(1), s(2), s(3)\}$ are subject to IFFT and then transmitted in a corresponding OFDM symbol. Accordingly, an ACK/NACK signal is transmitted on a PUCCH.

A reference signal having the PUCCH format 1b is also transmitted by spreading the reference signal into an orthogonal sequence after cyclically shifting a base sequence r(n). Assuming that CS indices corresponding to 3 RS OFDM symbols are $I_{cs4}$, $I_{cs5}$, and $I_{cs6}$, 3 CS sequences $r(n,I_{cs4})$, $r(n,I_{cs5})$, $r(n,I_{cs6})$ can be obtained. The 3 CS sequences are spread into an orthogonal sequence $w^{RS}_i(k)$ wherein K=3.

An orthogonal sequence index i, a CS index $I_{cs}$, and an RB index m are parameters necessary to configure a PUCCH and are also resources used to classify PUCCHs (or MSs). If the number of available CSs is 12 and the number of available orthogonal sequence indices is 3, a PUCCH for a total of 36 MSs can be multiplexed with one RB.

In 3GPP LTE, a resource index $n^{(1)}_{PUCCH}$ is defined so that UE can obtain the three parameters for configuring a PUCCH. The resource index $n^{(1)}_{PUCCH} = n_{CCE} + N^{(1)}_{PUCCH}$, wherein $n_{CCE}$ is the number of the first CCE used to send a corresponding PDCCH (i.e., PDCCH including the allocation of DL resources used to received downlink data corresponding to an ACK/NACK signal), and $N^{(1)}_{PUCCH}$ is a parameter that is informed of UE by a BS through a higher layer message.

Time, frequency, and code resources used to send an ACK/NACK signal are called ACK/NACK resources or PUCCH resources. As described above, an index of ACK/NACK resources (called an ACK/NACK resource index or PUCCH index) used to send an ACK/NACK signal on a PUCCH can be represented as at least one of an orthogonal sequence index i, a CS index $I_{cs}$, an RB index m, and an index for calculating the 3 indices. ACK/NACK resources can include at least one of an orthogonal sequence, a CS, a resource block, and a combination of them.

Figure 7:
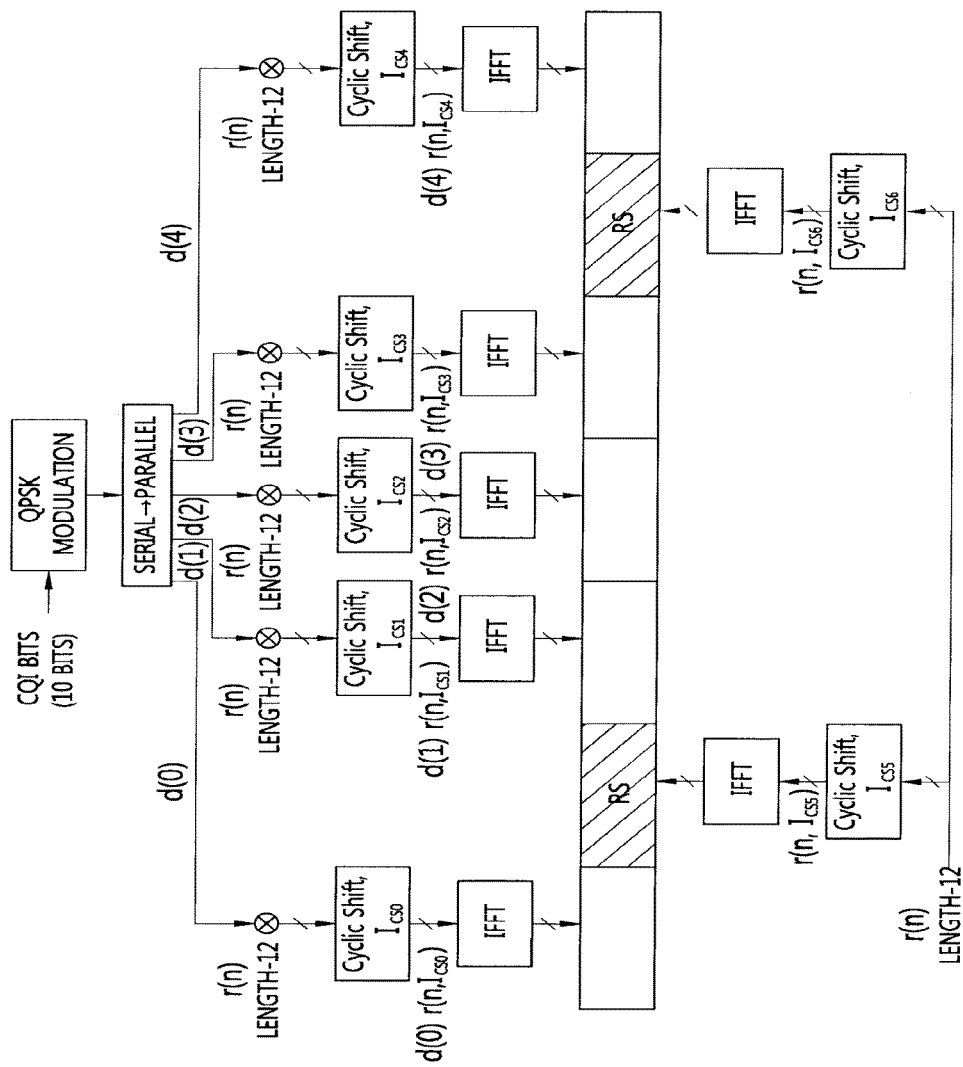
FIG. 7 shows the channel structure of PUCCH formats 2/2a/2b in a normal CP.

FIG. 7 shows the channel structure of the PUCCH formats 2/2a/2b in a normal CP.

Referring to FIG. 7, in a normal CP, OFDM symbols 1 and 5 (i.e., second and sixth OFDM symbols) are used to send a demodulation reference signal (DM RS), that is, an uplink reference signal, and the remaining OFDM symbols are used to send a CQI. In the case of an extended CP, an OFDM symbol 3 (fourth symbol) is used for a DM RS.

10 CQI information bits can be subject to channel coding at a ½ code rate, for example, thus becoming 20 coded bits. Reed-Muller code can be used in the channel coding. Next, the 20 coded bits are scramble and then subject to QPSK constellation mapping, thereby generating a QPSK modulation symbol (d(0) to d(4) in a slot 0). Each QPSK modulation symbol is modulated in a cyclic shift of a base RS sequence 'r(n)' having a length of 12, subject to IFFT, and then transmitted in each of 10 SC-FDMA symbols within a subframe. Uniformly spaced 12 CS s enable 12 different MS s to be orthogonally multiplexed in the same PUCCH RB. A base RS sequence 'r(n)' having a length of 12 can be used as a DM RS sequence applied to OFDM symbols 1 and 5.

Figure 8:
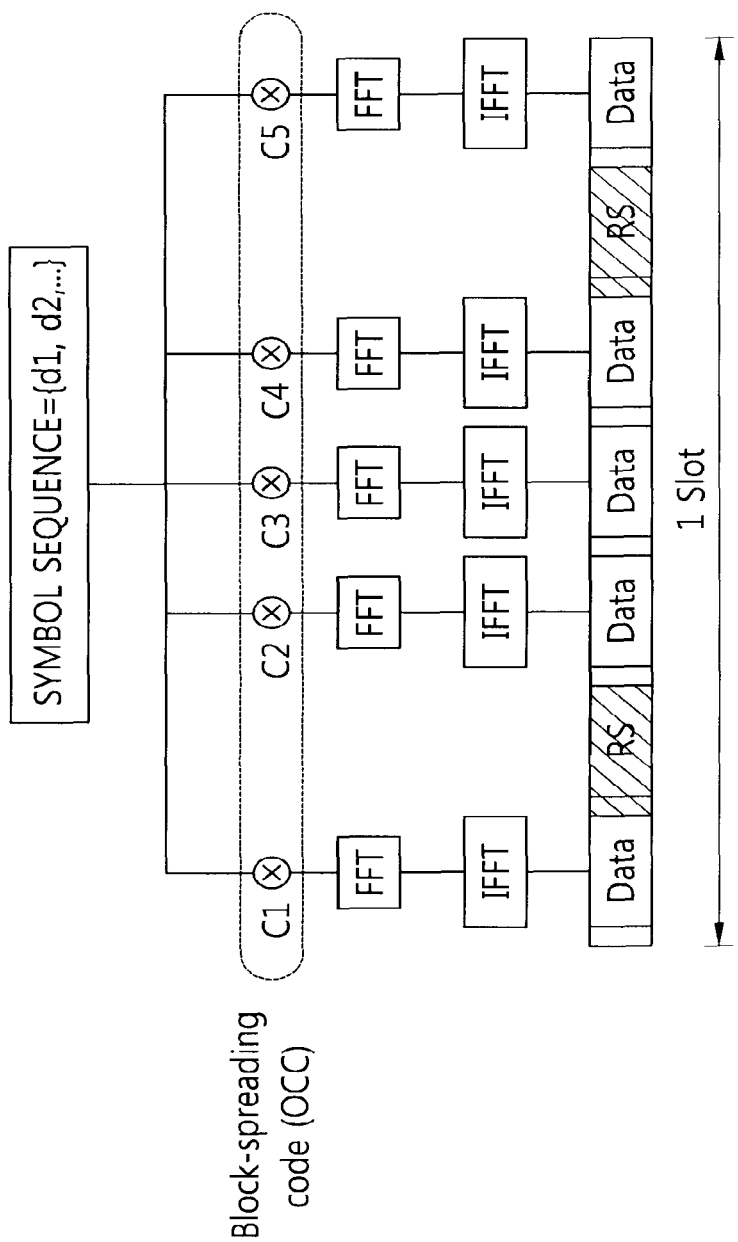
FIG. 8 illustrates an Enhanced (E)-PUCCH format based on block spreading.

FIG. 8 illustrates an Enhanced (E)-PUCCH format based on block spreading.

An E-PUCCH format is also called the PUCCH format 3.

Referring to FIG. 8, the E-PUCCH format is a PUCCH format that uses a block spreading scheme. The block spreading scheme means a method of multiplexing a modulation symbol sequence that has been modulated from multi-bit ACK/NACK using block spreading code. An SC-FDMA scheme can be used in the block spreading scheme. Here, the SC-FDMA scheme means a transmission method of performing IFFT after DFT spreading.

An E-PUCCH format is transmitted in such a manner that a symbol sequence (e.g., ACK/NACK symbol sequence) is spread in the time domain by way of block spreading code. Orthogonal Cover Code (OCC) can be used as the block spreading code. The control signals of several MSs can be multiplexed by the block spreading code. In the PUCCH format 2, one symbol sequence is transmitted in the time domain, and UE multiplexing is performed using the cyclic shift of a Constant Amplitude Zero Auto-Correlation (CA-ZAC) sequence. In contrast, in the E-PUCCH format, a symbol sequence including one or more symbols is transmitted in the frequency domain of each data symbol, the symbol sequence is spread in the time domain by way of block spreading code, and UE multiplexing is performed. An example in which 2 RS symbols are used in one slot has been illustrated in FIG. 8, but the present invention is not limited thereto. 3 RS symbols can be used, and OCC in which a spreading factor value is 4 may be used. An RS symbol can be generated from a CAZAC sequence having a specific CS and can be transmitted in such a manner that a plurality of RS symbols in the time domain has been multiplied by a specific OCC.

A carrier aggregation system is described below. The carrier aggregation system is also called a multiple carrier system.

A 3GPP LTE system supports a case where a DL bandwidth and an UL bandwidth are differently configured, but one Component Carrier (CC) is a precondition in this case. A 3GPP LTE system supports a maximum of 20 MHz and can be different in an UL bandwidth and a DL bandwidth, but supports only one CC in each of UL and DL.

A CA (also called a bandwidth aggregation or a spectrum aggregation) supports a plurality of CCs. For example, if 5 CCs are allocated as the granularity of a carrier unit having a 20 MHz bandwidth, a maximum of a 100 MHz bandwidth can be supported.

One DL CC or a pair of an UL CC and a DL CC can correspond to one cell. Accordingly, UE that communicates with a BS through a plurality of DL CCs can be said to be served from a plurality of serving cells.

Figure 9:
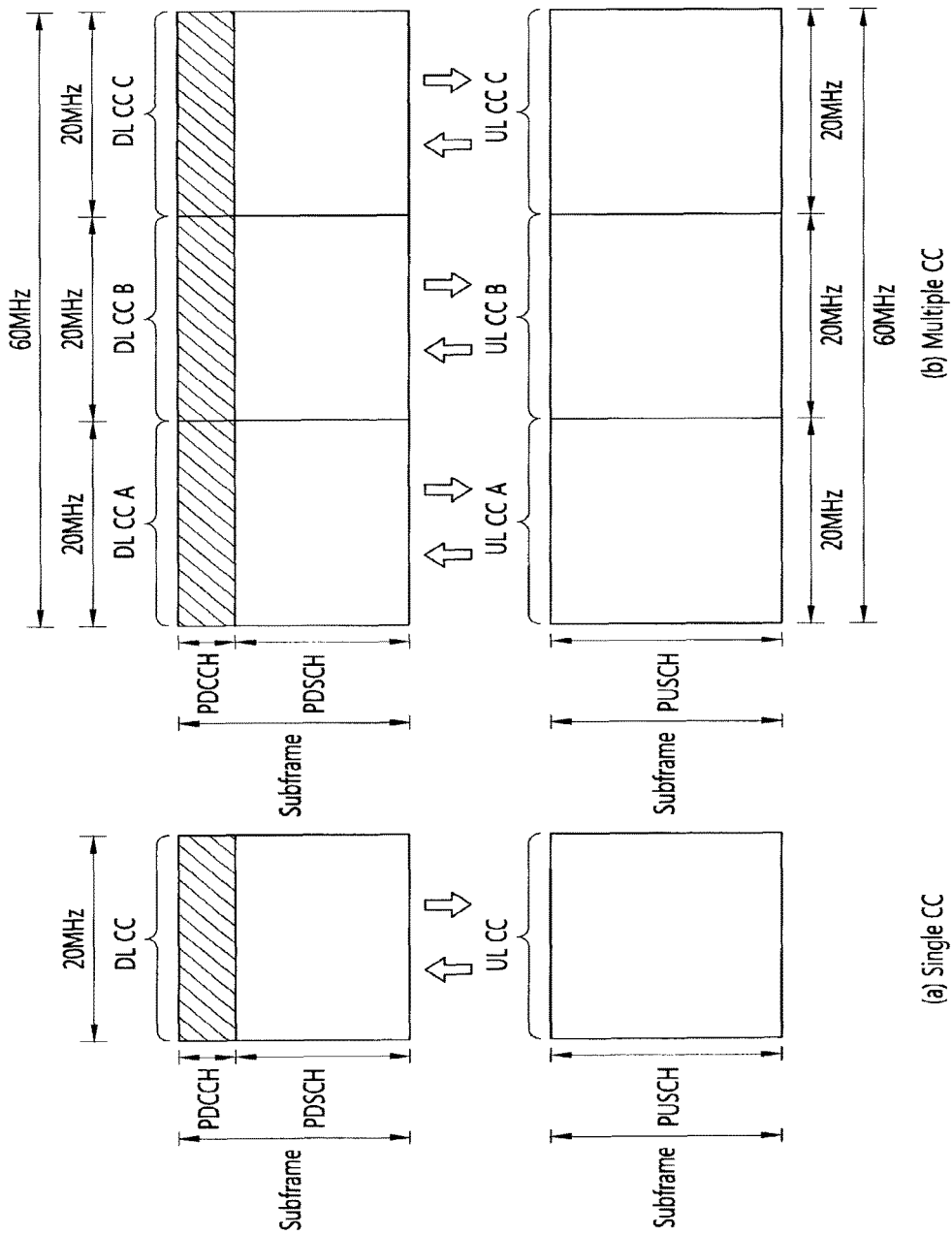
FIG. 9 shows an example of a comparison between a single carrier system and a carrier aggregation system.

FIG. 9 shows an example of a comparison between a single carrier system and a carrier aggregation system.

A carrier aggregation system (FIG. 9 (b)) has been illustrated as including three DL CCs and three UL CCs, but the number of DL CCs and UL CCs is not limited. A PDCCH and a PDSCH can be independently transmitted in each DL CC, and a PUCCH and a PUSCH can be independently transmitted in each UL CC. Or, a PUCCH may be transmitted only through a specific UL CC.

Since three pairs of DL CCs and UL CCs are defined, UE can be said to be served from three serving cells.

UE can monitor PDCCHs in a plurality of DL CCs and receive DL transport blocks through the plurality of DL CCs at the same time. UE can send a plurality of UL transport blocks through a plurality of UL CCs at the same time.

A pair of a DL CC #A and an UL CC #A can become a first serving cell, a pair of a DL CC #B and an UL CC #B can become a second serving cell, and a DL CC #C and an UL CC#C can become a third serving cell. Each serving cell can be identified by a Cell Index (CI). A CI can be unique within a cell or can be UE-specific.

The serving cell can be divided into a primary cell and a secondary cell. The primary cell is a cell on which UE performs an initial connection establishment procedure or initiates a connection re-establishment procedure or a cell designated as a primary cell in a handover process. The primary cell is also called a reference cell. The secondary cell can be configured after an RRC connection has been established and can be used to provide additional radio resources. At least one primary cell is always configured, and a secondary cell can be added/modified/released in response to higher layer signaling (e.g., an RRC message). The CI of a primary cell can be fixed. For example, the lowest CI can be designated as the CI of a primary cell.

The primary cell includes a downlink Primary Component Carrier (DL PCC) and an uplink PCC (UL PCC) in view of a CC. The secondary cell includes only a downlink Secondary Component Carrier (DL SCC) or a pair of a DL SCC and an UL SCC in view of a CC.

ACK/NACK transmission for HARQ in 3GPP LTE Time Division Duplex (TDD) is described below.

In TDD, unlike in a Frequency Division Duplex (FDD), a DL subframe and an UL subframe coexist in one radio frame. In general, the number of UL subframes is smaller than that of DL subframes. Accordingly, in preparation for a case where UL subframes for sending an ACK/NACK signal are not sufficient, a plurality of ACK/NACK signals for DL transport blocks received in a plurality of DL subframes is transmitted in one UL subframe.

In accordance with section 10.1 of 3GPP TS 36.213 V8.7.0 (2009-05), two ACK/NACK modes: ACK/NACK bundling and ACK/NACK multiplexing are initiated.

In ACK/NACK bundling, UE sends ACK if it has successfully decoded all received PDSCHs (i.e., DL transport blocks) and sends NACK in other cases. To this end, ACK or NACKs for each PDSCH are compressed through logical AND operations.

ACK/NACK multiplexing is also called ACK/NACK channel selection (or simply channel selection). In accordance with ACK/NACK multiplexing, UE selects one of a plurality of PUCCH resources and sends ACK/NACK.

Table below shows DL subframes n-k associated with an UL subframe n according to an UL-DL configuration in 3GPP LTE, wherein k∈K and M is the number of elements of a set K.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

It is assumed that M DL subframes are associated with the UL subframe n and, for example, M=3. In this case, UE can obtain 3 PUCCH resources $n^{(1)}_{PUCCH,0}$, $n^{(1)}_{PUCCH,1}$, and $n^{(1)}_{PUCCH,2}$ because it can receive 3 PDCCHs from 3 DL subframes. In this case, an example of ACK/NACK channel selection is the same as the following table.

TABLE 6

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

In the above table, HARQ-ACK(i) indicates ACK/NACK for an $i^{th}$ DL subframe of M DL subframes. Discontinuous transmission (DTX) means that a DL transport block has not been received on a PDSCH in a corresponding DL subframe or that a corresponding PDCCH has not been detected. In accordance with Table 6, 3 PUCCH resources $n^{(1)}_{PUCCH,0}$, $n^{(1)}_{PUCCH,1}$, and $n^{(1)}_{PUCCH,2}$ are present, and b(0), b(1) are two bits transmitted using a selected PUCCH.

For example, when UE successfully receives all 3 DL transport blocks in 3 DL subframes, the UE performs QPSK modulation on bits (1,1) using $n^{(1)}_{PUCCH,2}$ and sends them on a PUCCH. If UE fails in decoding a DL transport block in a first (i=0) DL subframe, but succeeds in decoding the remaining transport blocks, the UE sends bits (1,0) on a PUCCH using $n^{(1)}_{PUCCH,2}$. That is, in the existing PUCCH format 1b, only ACK/NACK of 2 bits can be transmitted. However, in channel selection, allocated PUCCH resources are linked to an actual ACK/NACK signal in order to indicate more ACK/NACK states. This channel selection is also referred to as channel selection using the PUCCH format 1b.

In ACK/NACK channel selection, if at least one ACK is present, NACK and DTX are coupled. This is because all ACK/NACK states cannot be represented by a combination of reserved PUCCH resources and a QPSK symbol. If ACK is not present, however, DTX is decoupled from NACK.

The above-described ACK/NACK bundling and ACK/NACK multiplexing can be applied in the case where one serving cell has been configured in UE in TDD.

For example, it is assumed that one serving cell has been configured (i.e., only a primary cell is configured) in UE in TDD, ACK/NACK bundling or ACK/NACK multiplexing is used, and M=1. That is, it is assumed that one DL subframe is associated with one UL subframe.

1) UE sends ACK/NACK in a subframe n if the UE detects a PDSCH indicated by a corresponding PDCCH in a subframe n-k of a primary cell or detects a Semi-Persistent Scheduling (SPS) release PDCCH. In LTE, a BS can inform UE that semi-persistent transmission and reception are performed in what subframes through a higher layer signal, such as Radio Resource Control (RRC). Parameters given by the higher layer signal can be, for example, the periodicity of a subframe and an offset value. When the UE receives the activation or release signal of SPS transmission through a PDCCH after recognizing semi-persistent transmission through the RRC signaling, the UE performs or releases SPS PDSCH reception or SPS PUSCH transmission. That is, the UE does not immediately perform SPS transmission/reception although SPS scheduling is allocated thereto through the RRC signaling, but when an activation or release signal is received through a PDCCH, performs SPS transmission/reception in a subframe that corresponds to frequency resources (resource block) according to the allocation of the resource block designated by the PDCCH, modulation according to MCS information, a subframe periodicity allocated through the RRC signaling according to a code rate, and an offset value. Here, a PDCCH that releases SPS is called an SPS release PDCCH, and a DL SPS release PDCCH that releases DL SPS transmission requires the transmission of an ACK/NACK signal.

Here, in the subframe n, UE sends ACK/NACK using the PUCCH formats 1a/1b according to a PUCCH resource $n^{(1,\tilde{p})}_{PUCCH}$. In $n^{(1,\tilde{p})}_{PUCCH}$, p indicates an antenna port p. The k is determined by Table 5.

The PUCCH resource $n^{(1,\tilde{p})}_{PUCCH}$ can be allocated as in the following equation. P can be p0 or p1.

$$n^{(1,\tilde{p}=p0)}_{PUCCH} = (M-m-1) \cdot N_c + m \cdot N_{c+1} + N_{CCE} + N^{PUCCH}_{(1)} \text{ for antenna port } p=p0,$$

$$n^{(1,\tilde{p}=p1)}_{PUCCH} = (M-m-1) \cdot N_c + m \cdot N_{c+1} + (n_{CCE}+1) + N^{(1)}_{PUCCH} \text{ for antenna port } p=p1, \quad \text{[Equation 3]}$$

In Equation 3, c is selected in such a way as to satisfy $N_c \leq n_{CCE} \leq N_{c+1}$ (antenna port p0), $N_c \leq (n_{CCE}+1) < N_{c+1}$ (antenna port p1) from among {0,1,2,3}. $N^{(1)}_{PUCCH}$ is a value set by a higher layer signal. $N_c = \max\{0, \text{floor } [N^{DL}_{RB} \cdot (N^{RB}_{SC} \cdot c-4)/36]\}$. The $N^{DL}_{RB}$ is a DL bandwidth, and $N^{RB}_{SC}$ is the size of an RB indicated by the number of subcarriers in the frequency domain. $n_{CCE}$ is a first CCE number used to send a corresponding PDCCH in a subframe n-km. m is a value that makes km the smallest value in the set K of Table 5.

2) If UE detects an SPS PDSCH, that is, a PDSCH not including a corresponding PDCCH, in the DL subframe n-k of a primary cell, the UE can send ACK/NACK in the subframe n using the PUCCH resource $n^{(1,\tilde{p})}_{PUCCH}$ as follows.

Since an SPS PDSCH does not include a scheduling PDCCH, UE sends ACK/NACK through the PUCCH formats 1a/1b according to $n^{(1,\tilde{p})}_{PUCCH}$ that is configured by a higher layer signal. For example, 4 resources (a first PUCCH resource, a second PUCCH resource, a third PUCCH resource, and a fourth PUCCH resource) can be reserved through an RRC signal, and one resource can be indicated through the Transmission Power Control (TPC) field of a PDCCH that activates SPS scheduling.

The following table is an example in which resources for channel selection are indicated by a TPC field value.

TABLE 7

| TPC field value | Resource for channel selection |
|---|---|
| '00' | First PUCCH resource |
| '01' | Second PUCCH resource |
| '10' | Third PUCCH resource |
| '11' | Fourth PUCCH resource |

For another example, it is assumed that in TDD, one serving cell is configured (i.e., only a primary cell is configured) in UE, ACK/NACK multiplexing is used, and M>1. That is, it is assumed that a plurality of DL subframes is associated with one UL subframe.

1) A PUCCH resource $n^{(1)}_{PUCCH,i}$ for sending ACK/NACK when UE receives a PDSCH in a subframe n-k$_i$ (0≤i≤M-1) or detects a DL SPS release PDCCH can be allocated as in the following equation. Here, k$_i$∈K, and the set K has been described with reference to Table 5.

$$n^{(1)}_{PUCCH,i} = (M-i-1) \cdot N_c + i \cdot N_{c+1} + n_{CCE,i} + N^{(1)}_{PUCCH} \quad \text{[Equation 4]}$$

Here, c is selected from {0,1,2,3} so that $N_c \le n_{CCE,i} < N_{c+i}$ is satisfied. $N^{(1)}_{PUCCH}$ is a value set by a higher layer signal.

$N_c = \max\{0, \text{floor}[N^{DL}_{RB} \cdot (N^{RB}_{sc} \cdot c - 4)/36]\}$. The $N^{DL}_{RB}$ is a DL bandwidth, and $N^{RB}_{sc}$ is the size of an RB indicated by the number of subcarriers in the frequency domain. $n_{CCE,i}$ is a first CCE number used to send a corresponding PDCCH in the subframe n-k$_i$.

2) If UE receives a PDSCH (i.e., SPS PDSCH) not having a corresponding PDCCH in the subframe, $n^{(1)}_{PUCCH,i}$ is determined by a configuration given by a higher layer signal and Table 7.

If two or more serving cells have been configured in UE in TDD, the UE sends ACK/NACK using channel selection that uses the PUCCH format 1b or the PUCCH format 3. Channel selection that uses the PUCCH format 1b used in TDD can be performed as follows.

If a plurality of serving cells using channel selection that uses the PUCCH format 1b has been configured, when ACK/NACK bits are greater than 4 bits, UE performs spatial ACK/NACK bundling on a plurality of codewords within one DL subframe and sends spatially bundled ACK/NACK bits for each serving cell through channel selection that uses the PUCCH format 1b. Spatial ACK/NACK bundling means the compression of ACK/NACK for each codeword through logical AND operations within the same DL subframe.

If ACK/NACK bits are 4 bits or lower, spatial ACK/NACK bundling is not used and the ACK/NACK bits are transmitted through channel selection that uses the PUCCH format 1b.

If 2 or more serving cells using the PUCCH format 3 have been configured in UE, when ACK/NACK bits are greater than 20 bits, spatial ACK/NACK bundling can be performed in each serving cell and ACK/NACK bits subjected to spatial ACK/NACK bundling can be transmitted through the PUCCH format 3. If ACK/NACK bits are 20 bits or lower, spatial ACK/NACK bundling is not used and the ACK/NACK bits are transmitted through the PUCCH format 3.

<Channel Selection Using the PUCCH Format 1b Used in FDD>

If two serving cells using FDD have been configured in UE, ACK/NACK can be transmitted through channel selection that uses the PUCCH format 1b. The UE can feed ACK/NACK for a maximum of 2 transport blocks, received in one serving cell, back to a BS by sending 2-bit (b(0)b(1)) information in one PUCCH resource selected from a plurality of PUCCH resources. One codeword can be transmitted in one transport block. A PUCCH resource can be indicated by a resource index $n^{(1)}_{PUCCH,i}$. Here, A is any one of {2, 3, 4}, and i is 0≤i≤(A-1). The 2-bit information is indicated as b(0)b(1).

HARQ-ACK(j) indicates an HARQ ACK/NACK response that is related to a transport block or DL SPS release PDCCH transmitted by a serving cell. The HARQ-ACK(j), the serving cell, and the transport block can have the following mapping relationship.

TABLE 8

| | | HARQ-ACK(j) | | |
|---|---|---|---|---|
| A | HARQ-ACK(0) | HARQ-ACK(1) | HARQ-ACK(2) | HARQ-ACK(3) |
| 2 | Transport block 1 of primary cell | Transport block 2 of secondary cell | NA | NA |
| 3 | Transport block 1 of serving cell 1 | Transport block 2 of serving cell 1 | Transport block 3 of serving cell 2 | NA |
| 4 | Transport block 1 of primary cell | Transport block 2 of primary cell | Transport block 3 of secondary cell | Transport block 4 of secondary cell |

In Table 8, for example, in the case of A=4, HARQ-ACK (0) and HARQ-ACK(1) indicate ACK/NACKs for 2 transport blocks transmitted in a primary cell, and HARQ-ACK (2) and HARQ-ACK(3) indicate ACK/NACKs for 2 transport blocks transmitted in a secondary cell.

When UE receives a PDSCH or detects a DL SPS release PDCCH by detecting a PDCCH in a subframe 'n-4' of a primary cell, the UE sends ACK/NACK using a PUCCH resource $n^{(1)}_{PUCCH,i}$. Here, $n^{(1)}_{PUCCH,i}$ is determined to be $n_{CCE,i} + N^{(1)}_{PUCCH}$. Here, $n_{CCE,i}$ means an index of the first CCE that is used to send a PDCCH by a BS, and $N^{(1)}_{PUCCH}$ is a value set through a higher layer signal. If a transmission mode of a primary cell supports up to two transport blocks, a PUCCH resource $n^{(1)}_{PUCCH,i+1}$ is given. Here, $n^{(1)}_{PUCCH,i+1}$ can be determined to be $n_{CCE,i} + 1 + N^{(1)}_{PUCCH}$. That is, if a primary cell is set in a transmission mode in which a maximum of up to 2 transport blocks can be transmitted, 2 PUCCH resources can be determined.

If a PDCCH detected in a subframe 'n-4' of a primary cell is not present, a PUCCH resources $n^{(1)}_{PUCCH,i}$ for sending ACK/NACK for a PDSCH is determined by a higher layer configuration. If up to 2 transport blocks are supported, a PUCCH resource $n^{(1)}_{PUCCH,i+1}$ can be given as $n^{(1)}_{PUCCH,i+1} = n^{(1)}_{PUCCH,i+1}$.

If a PDSCH is received in a secondary cell by detecting a PDCCH in a subframe 'n-4', PUCCH resources $n^{(1)}_{PUCCH,i}$ and $n^{(1)}_{PUCCH,i+1}$ for a transmission mode in which up to 2 transport blocks are supported can be determined by a higher layer configuration.

In the prior art, it was a precondition that a plurality of serving cells configured in UE uses radio frames having the same type. For example, it was a precondition that all of a plurality of serving cells configured in UE use FDD frames or use TDD frames. In the next-generation wireless communication system, however, different types of radio frames may be used in serving cells.

Figure 10:
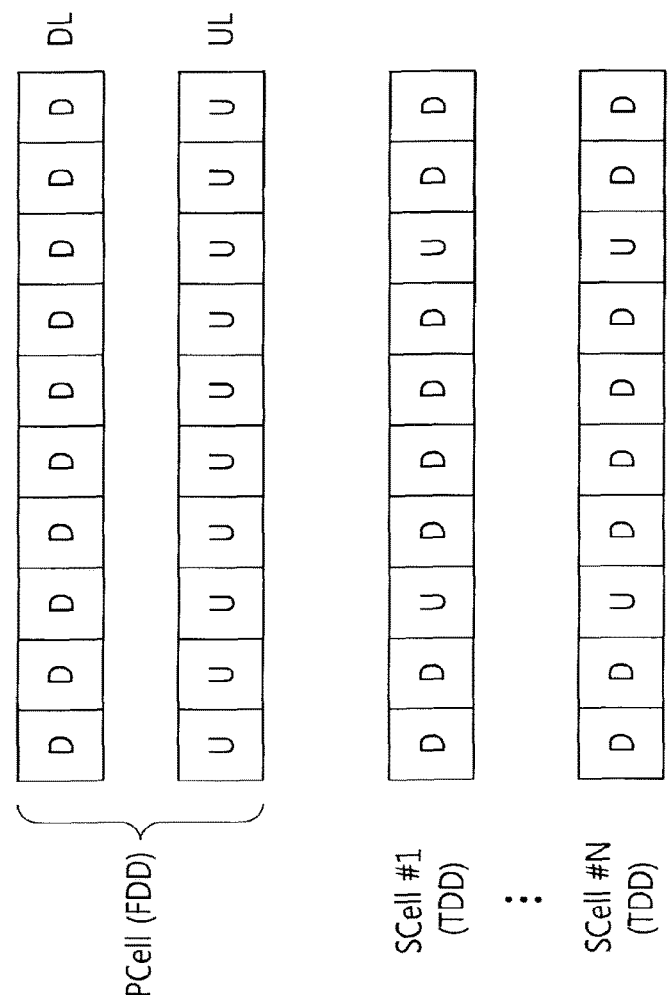
FIG. 10 shows one example in which a plurality of serving cells uses different types of radio frames in a wireless communication system.

FIG. 10 shows one example in which a plurality of serving cells uses different types of radio frames in a wireless communication system.

Referring to FIG. 10, a primary cell PCell and a plurality of secondary cells SCell #1, . . . , SCell #N can be configured in UE. In this case, the primary cell can operate in FDD and use an FDD frame, and the secondary cells can operate in TDD and use TDD frames. The same UL-DL configuration can be used in the plurality of secondary cells. A DL subframe (indicated by D) and an UL subframe (indicated by U) are present in a 1:1 relationship in the primary cell, but a DL subframe and an UL subframe may be present in ratios not 1:1 in the secondary cells.

Table 9 below shows that ACK/NACK is transmitted in what a subframe according to an UL-DL configuration when one serving cell operates in TDD.

TABLE 9

| UL-DL Configu- | Subframe n | | | | | | | | | |
|---|---|---|---|---|---|---|---|---|---|---|
| ration | 0 | 1 | 2 | 3 | 4 | 5 | 6 | 7 | 8 | 9 |
| 0 | 4 | 6 | | | 4 | 6 | | | | |
| 1 | 7 | 6 | | | 4 | 7 | 6 | | | 4 |
| 2 | 7 | 6 | | 4 | 8 | 7 | 6 | | 4 | 8 |
| 3 | 4 | 11 | | | | 7 | 6 | 6 | 5 | 5 |
| 4 | 12 | 11 | | | 8 | 7 | 7 | 6 | 5 | 4 |
| 5 | 12 | 11 | | 9 | 8 | 7 | 6 | 5 | 4 | 13 |
| 6 | 7 | 7 | | | | 7 | 7 | | | 5 |

In Table 9, when UE receives a PDSCH or a PDCCH (e.g., DL SPS release PDCCH) necessary for an ACK/NACK response in a subframe n, the UE sends ACK/NACK in a subframe 'n+k(n)'. Each of the values of Table 9 indicates the k(n) value. For example, Table 9 indicates that if an UL-DL configuration is 0 and a PDSCH is received in a subframe 0, ACK/NACK is transmitted in a subframe 4 after four subframes. A specific time is necessary in order for UE to send ACK/NACK after receiving a PDSCH or a DL SPS release PDCCH. A minimum value of this specific time is hereinafter indicated as '$k_{min}$', and a value of $k_{min}$ can be four subframes. In Table 9, a point of time at which ACK/NACK is transmitted is described below. It can be seen that ACK/NACK is chiefly transmitted in the first UL subframe after '$k_{min}$' elapses. However, an underline number in Table 9 does not indicates the first UL subframe after '$k_{min}$' elapses, but indicates an UL subframe placed next. This is for preventing ACK/NACK for too many DL subframes from being transmitted in one UL subframe. It is difficult to apply this ACK/NACK transmission timing in TDD to a wireless communication system that uses different types of radio frames without change.

In a wireless communication system, UL control information, such as ACK/NACK, can be transmitted through a specific serving cell, that is, a primary cell. In the prior art, it was a precondition that all serving cells use radio frames having the same type. ACK/NACK transmission timing, that is, HARQ timing, was determined based on this assumption. If a plurality of serving cells uses different types of radio frames, it is necessary to define that ACK/NACK will be transmitted using what method.

It is hereinafter assumed that a primary cell and at least one secondary cell are configured in UE in a wireless communication system. It is also assumed that the primary cell uses an FDD frame and the secondary cell uses a TDD frame. Any one of the UL-DL configurations of Table 1 can be used in the TDD frame. Hereinafter, only a relationship between a primary cell and one secondary cell is illustrated, for convenience of description, but this relationship can be applied to a relationship between a primary cell and each of a plurality of secondary cells when the plurality of secondary cells is configured in UE.

Under this assumption, first, a method of transmitting ACK/NACK for downlink data received through a primary cell is described below. Hereinafter, the downlink data generally indicates a PDSCH that requests an ACK/NACK response, a codeword included in a PDSCH, a DL SPS release PDCCH indicating a DL SPS release and the like.

Figure 11:
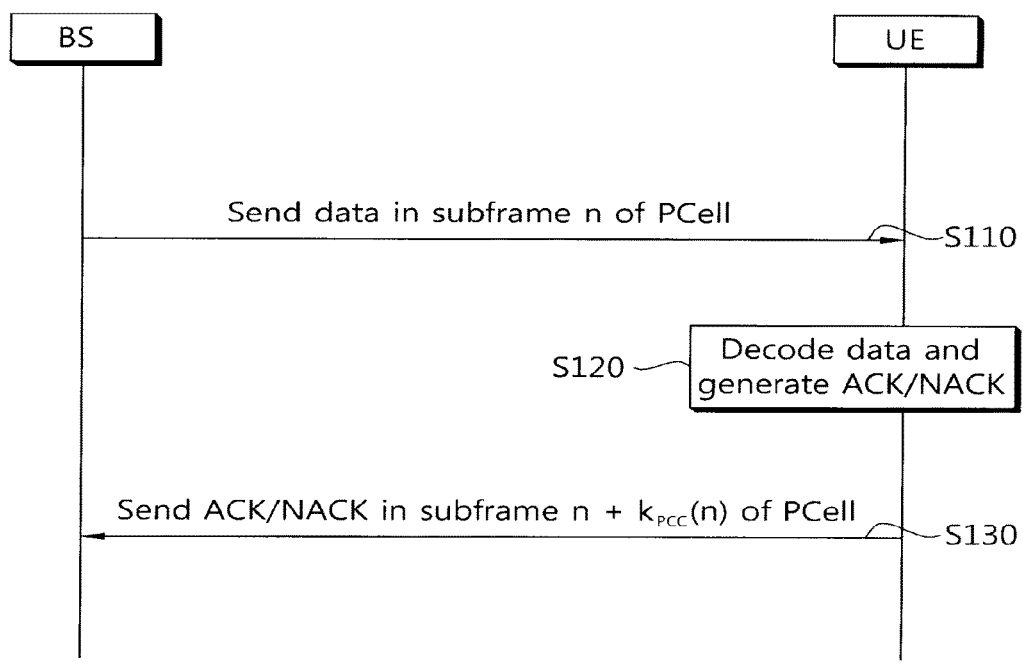
FIG. 11 shows a method of transmitting ACK/NACK for downlink data received through a primary cell.

FIG. 11 shows a method of transmitting ACK/NACK for downlink data received through a primary cell.

Referring to FIG. 11, a BS sends downlink data in the subframe n of a primary cell (S110). UE receives the downlink data in the subframe n of the DL PCC of the primary cell.

The UE decodes the downlink data and generates ACK/NACK for the downlink data (S120).

The UE sends the ACK/NACK in the subframe n+$k_{PCC}$(n) of the primary cell (S130).

The subframe n+$k_{PCC}$(n) of the primary cell is a subframe after a minimum delay time (this is called $k_{min}$) necessary for an ACK/NACK response has elapsed from a point of time at which the downlink data was received. Here, the minimum delay time $k_{min}$ may be four subframes. Accordingly, the UE can send the ACK/NACK in the subframe n+4 of the UL PCC of the primary cell.

That is, in the primary cell, as in the case where an HARQ is performed in conventional FDD, the ACK/NACK is transmitted in a subframe after four subframes elapse from a subframe in which data was received.

A method of UE sending ACK/NACK when the UE receives downlink data in a secondary cell is described below.

Figure 12:
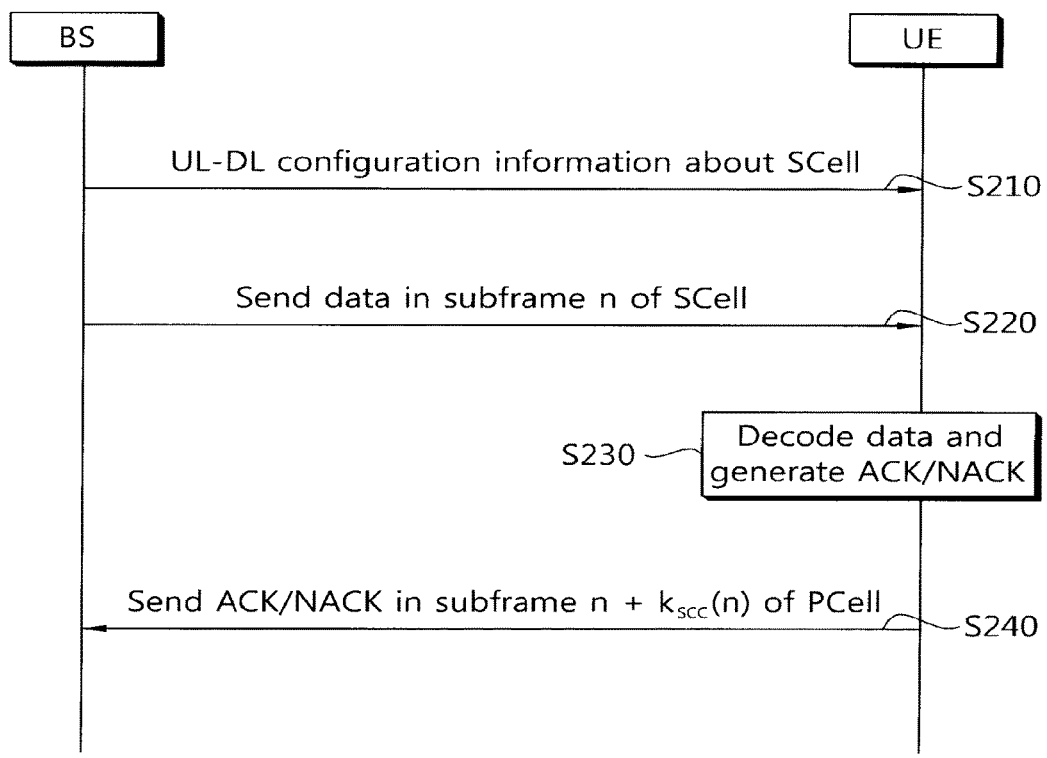
FIG. 12 shows a method of transmitting ACK/NACK for downlink data received through a secondary cell.

FIG. 12 shows a method of transmitting ACK/NACK for downlink data received through a secondary cell.

Referring to FIG. 12, a BS sends information about the UL-DL configuration of a secondary cell (S210). The secondary cell may need the UL-DL configuration information because it operates in TDD. The UL-DL configuration information can be transmitted through a higher layer signal, such as an RRC message.

A BS sends downlink data in the subframe n of the secondary cell (S220).

The UE decodes the downlink data and generates ACK/NACK for the downlink data (S230).

The UE can send the ACK/NACK to the BS through the subframe n+$k_{SCC}$(n) of a primary cell (S240). The subframe n+$k_{SCC}$(n) can be determined by the following method.

<Method 1>

Method 1 is a method in which the subframe n+$k_{SCC}$(n) complies with ACK/NACK transmission timing in the primary cell. That is, Method 1 is a method of configuring the UL subframe of the primary cell that is the same as n+$k_{min}$ as the subframe n+$k_{SCC}$(n). In other words, if data is received in the subframe n of a secondary cell, ACK/NACK for the data is transmitted in the subframe n+$k_{min}$ of a primary cell. Here, $k_{min}$ can be, for example, four subframes.

Figure 13:
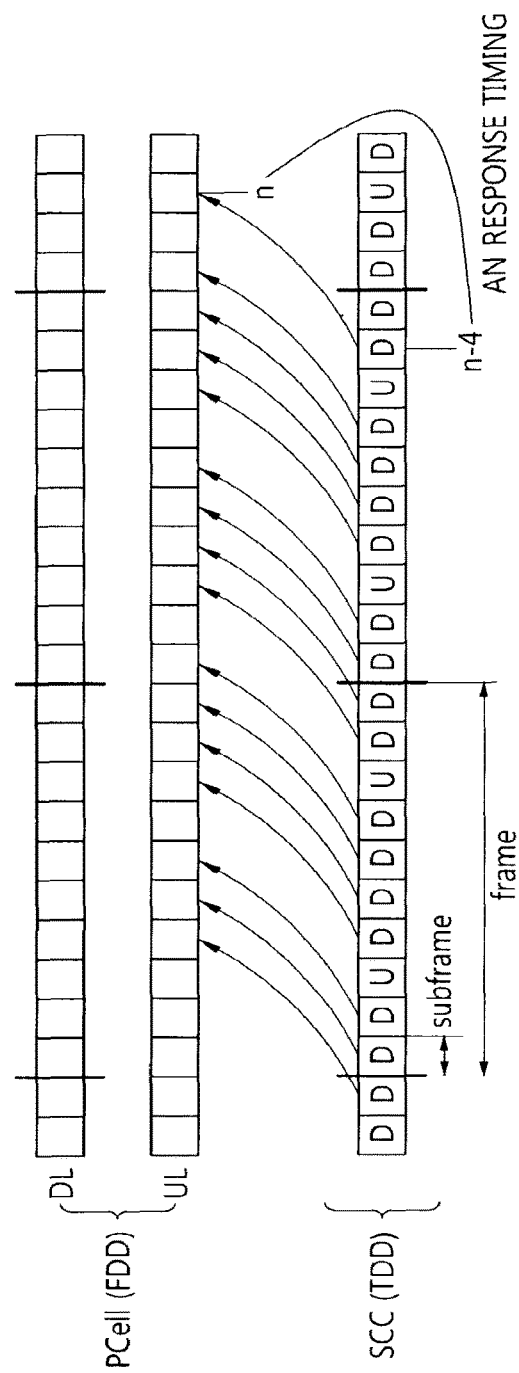
FIG. 13 shows Method 1 when '$k_{min}$' is four subframes.

FIG. 13 shows Method 1 when '$k_{min}$' is four subframes.

Referring to FIG. 13, downlink data is received in the DL subframe of a secondary cell using a TDD frame, and ACK/NACK for the downlink data is transmitted in the UL subframe of a primary cell. It can be seen that the UL subframe is a subframe placed after four subframes from the DL subframe of the secondary cell.

In accordance with Method 1, there is an advantage in that ACK/NACK delay is minimized because ACK/NACK for downlink data received in a secondary cell is always transmitted after $k_{min}$ subframes on the basis of a point of time at which the downlink data was received.

Furthermore, in conventional TDD, if the number of DL subframes corresponding to one UL subframe is many, there is a problem in that the number of ACK/NACKs that must be transmitted in the one UL subframe is increased. However, Method 1 is advantageous in that ACK/NACK transmission is distributed.

If the UL subframe of a primary cell in which ACK/NACK is transmitted is a subframe n, the number of ACK/NACK resources that need to be secured in the subframe n can be determined by a transmission mode of the primary cell for a subframe $n-k_{min}$ and a transmission mode in the DL subframe of a secondary cell.

In accordance with Method 1, ACK/NACK timing applied to UE may be represented by changing Table 5 into Table 10 below.

TABLE 10

| UL-DL Configu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | — | — | — | 4 | 4 | — | — | — | 4 |
| 1 | 4 | — | — | 4 | 4 | 4 | — | — | 4 | 4 |
| 2 | 4 | — | 4 | 4 | 4 | 4 | — | 4 | 4 | 4 |
| 3 | 4 | 4 | 4 | 4 | 4 | 4 | — | — | — | 4 |
| 4 | 4 | 4 | 4 | 4 | 4 | 4 | — | — | 4 | 4 |
| 5 | 4 | 4 | 4 | 4 | 4 | 4 | — | 4 | 4 | 4 |
| 6 | 4 | — | 4 | 4 | 4 | — | — | — | 4 | — |

That is, if the UL-DL configuration of a secondary cell is the same as any one of Table 10 and a primary cell uses an FDD frame, a subframe n is a subframe in which ACK/NACK is transmitted and a number indicated in the subframe n indicates $k_{min}$. Here, the subframe $n-k_{min}$ indicates a subframe in which downlink data, that is, the subject of ACK/NACK, is received. For example, in Table 10, an UL-DL configuration is 0, and 4 is written in a subframe 9. In this case, it indicates that ACK/NACK for downlink data received in the subframe 5 (=9−4) of a secondary cell is transmitted in the subframe 9.

In accordance with Method 1, ACK/NACK timing applied to UE may be represented by changing Table 9 into Table 11 below.

TABLE 11

| UL-DL Configu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 4 | | — | | 4 | 4 | | — | |
| 1 | 4 | 4 | | | 4 | 4 | 4 | | | 4 |
| 2 | 4 | 4 | | 4 | 4 | 4 | 4 | | 4 | 4 |
| 3 | 4 | 4 | | | | 4 | 4 | 4 | 4 | 4 |
| 4 | 4 | 4 | | | 4 | 4 | 4 | 4 | 4 | 4 |

TABLE 11-continued

| UL-DL Configu-ration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | 4 | 4 | | 4 | 4 | 4 | 4 | 4 | 4 | 4 |
| 6 | 4 | 4 | | | | 4 | 4 | | | 4 |

In Table 11, a subframe n indicates a subframe in which downlink data is received. A subframe $n+k_{SCC}(n)$ is a subframe in which ACK/NACK for the downlink data is transmitted. Each of values in Table 11 indicate a $k_{SCC}(n)$ value for the subframe n. For example, it indicates that if an UL-DL configuration is 0 and downlink data is received in the subframe 1 of a secondary cell, ACK/NACK is transmitted in a subframe 5 (of a primary cell) after four subframes.

Tables 10 and 11 and FIG. 13 have a precondition that the radio frame boundaries of a secondary cell and a primary cell are the same. That is, it is a precondition that the radio frame of the primary cell is synchronized with the radio frame of the secondary cell. If the radio frame of the primary cell is not synchronized with the radio frame of the secondary cell, additional subframe delay (indicated by $k_{add}$) for compensating for this asynchronization can be taken into consideration. That is, in Method 1, $k_{SCC}(n)$ may be changed into $k_{min}+k_{add}$.

Or, assuming that downlink data is received in the subframe n of a secondary cell and a subframe in which ACK/NACK for the downlink data is transmitted is $n+k_{SCC}(n)$, if the $k_{SCC}(n)$ is smaller than $k_{min}+k_{add}$, scheduling may be limited so that the downlink data is not transmitted in the subframe n of the secondary cell.

<Method 2>

Method 2 is a method of determining a subframe $n+k_{SCC}(n)$ in which ACK/NACK is transmitted based on TDD ACK/NACK transmission timing in a secondary cell. That is, $k_{SCC}(n)$ is determined as in Table 9, but actual ACK/NACK is transmitted through the UL PCC of a primary cell.

Figure 14:
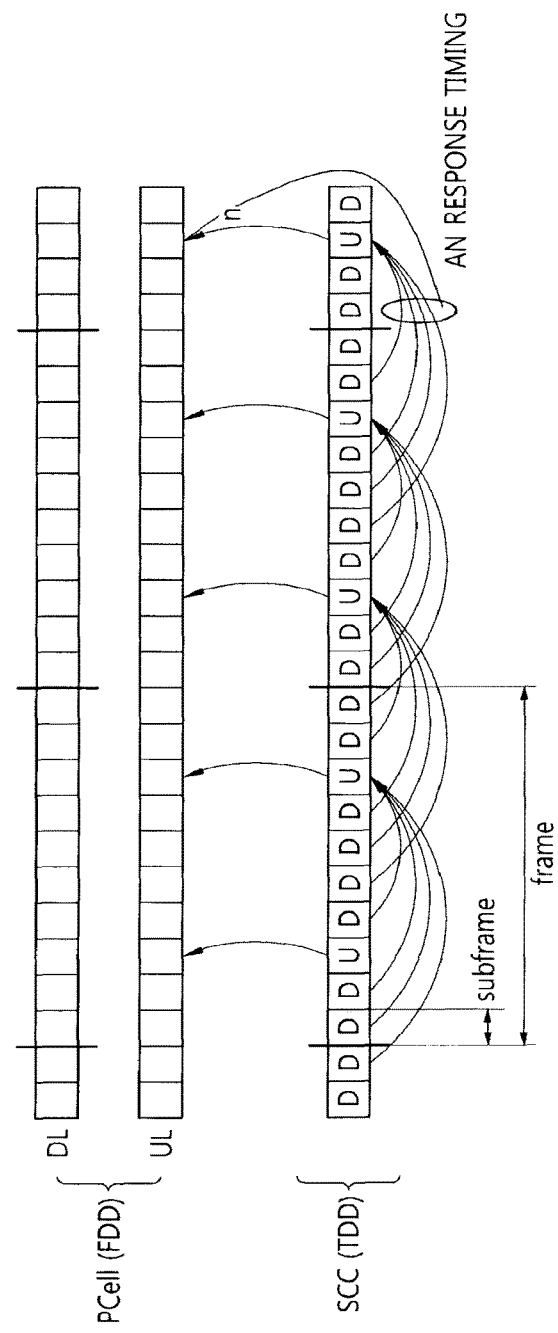
FIG. 14 shows Method 2.

FIG. 14 shows Method 2.

Referring to FIG. 14, downlink data is received in the DL subframe of a secondary cell using a TDD frame, and ACK/NACK for the downlink data is transmitted in the UL subframe of a primary cell. Here, timing at which the ACK/NACK is transmitted complies with TDD ACK/NACK transmission timing in the secondary cell. That is, $k_{SCC}(n)$ can be determined as in Table 9.

Or, if ACK/NACK for downlink data received in a subframe $n-k_1$ is defined to be transmitted in a subframe n, Table 5 may be used to determine the ki value. Referring to Table 5, for example, if the UL-DL configuration of a secondary cell is 0, ACK/NACK transmitted in the subframe 2 is for downlink data received in a subframe prior to 6 subframes. Or, if the UL-DL configuration is 2, ACK/ANCK transmitted in the subframe 2 is for downlink data received prior to 8, 7, 4 or 6 subframes. In this case, however, ACK/NACK transmission is performed through the UL PCC of a primary cell not the secondary cell.

Method 2 is advantageous in that ACK/NACK timing when one serving cell operating in TDD is configured in UE and the serving cell is used as a primary cell can be applied to a case where a serving cell is used as a secondary cell without change.

Assuming that the subframe of a primary cell in which ACK/NACK is transmitted is a subframe n, the number of ACK/NACK resources to be secured in the subframe n is determined by the number of DL subframes of a corresponding primary cell and secondary cell, a transmission mode in the DL subframe of the secondary cell and the like.

If the radio frame of a primary cell is not synchronized with that of a secondary cell, additional subframe delay (indicated by $k_{add}$) for compensating for this asynchronization can be taken into consideration. The $k_{add}$ may be a fixed value or may be a value set through an RRC message. In Method 2, assuming that $k'_{SCC}(n)=k_{SCC}(n)+k_{add}$, ACK/NACK for downlink data received in the subframe n of a secondary cell may be represented as being transmitting in the UL subframe $n+k'_{SCC}(n)$ of a primary cell.

Or, assuming that downlink data is received in the subframe n of a secondary cell and a subframe in which ACK/NACK for the downlink data is transmitted is $n+k_{SCC}(n)$, if the $k_{SCC}(n)$ is smaller than $k_{min}+k_{add}$, scheduling may be limited so that the downlink data is not transmitted in the subframe n of the secondary cell.

If Method 1 is used as the method of transmitting ACK/NACK in a primary cell and the method of transmitting ACK/NACK for a secondary cell, ACK/NACK for a primary cell and a secondary cell can comply with an ACK/NACK transmission scheme used in FDD. For example, channel selection that uses the PUCCH format 1b used in FDD when a plurality of serving cells is configured in UE can be used. That is, ACK/NACK for the secondary cell is transmitted using channel selection that uses the PUCCH format 1b through a primary cell without using a compression scheme, such as ACK/NACK bundling. A compression scheme, such as ACK/NACK bundling, may be used because only one DL subframe is associated with one UL subframe of a primary cell.

In contrast, if Method 2 is used as the method of transmitting ACK/NACK in a primary cell and the method of transmitting ACK/NACK for a secondary cell, ACK/NACK for a primary cell and a secondary cell can comply with an ACK/NACK transmission scheme used in TDD. For example, ACK/NACK can be transmitted through channel selection that uses the PUCCH format 1b used when a plurality of serving cells is configured in TDD.

In an aggregation of serving cells to which different types of radio frames are applied, if UL transmission and DL reception are present in the same time interval, interference attributable to the UL transmission can occur in the DL reception. Accordingly, UL transmission and DL reception are not preferred in neighboring frequency bands. To this end, frequency bands can be grouped according to frequency bands that are spaced apart from one another without making interference with them, and different types of radio frames can be used according to the spaced frequency band group. UE that uses each frequency band group can have an independent wireless frequency transmission module and use an additional power amplifier.

Furthermore, unlike in the prior art in which a control signal-dedicated channel on which ACK/NACK is carried is transmitted through only a primary cell, a PUCCH can be transmitted in a specific serving cell that belongs to a frequency band group other than frequency band groups to which a primary cell belongs. In this case, ACK/NACK timing (i.e., HARQ timing) transmitted in the PUCCH is not problematic even in existing ACK/NACK timing.

A DCI format used in a carrier aggregation system in which different types of radio frames are used is described below.

In the case of an existing TDD system, since a plurality of DL subframes is associated with one UL subframe, a Downlink Assignment Index (DAI) field of 2 bits is included in a PDCCH on which a downlink grant is carried or a PDCCH on which an uplink grant is carried and then transmitted in order to prevent an ACK/NACK error in the UL subframe.

The DAI included in the PDCCH on which the downlink grant is carried includes information about order of PDSCHs that are transmitted in the DL subframes corresponding to the UL subframe. The DAI included in the PDCCH on which the uplink grant is carried includes information about the sum of the number of DL subframes corresponding to the UL subframe and the number of DL SPS release PDCCHs.

Meanwhile, if serving cells operating in TDD are aggregated, a DAI included in a PDCCH on which an uplink grant is carried becomes information capable of determining the size of an ACK/NACK payload that is piggybacked to a PUSCH. For example, information about a maximum value can be obtained from the sum of a total number of PDSCHs that are transmitted in DL subframes associated with one UL subframe and the number of DL SPS release PDCCHs on the basis of each of serving cells aggregated through a DAI that is included in a PDCCH on which an uplink grant is carried. The size of a piggybacked ACK/NACK payload can be determined using the maximum value. If serving cells operating in FDD are aggregated, a DAI is not necessary because a DL subframe corresponds to an UL subframe in a 1:1 manner.

In the present invention, a serving cell operating in FDD and a serving cell operating in TDD are aggregated. Accordingly, in this case, how a DAI field will be configured is problematic.

1. Adding a DAI Field to the DCI of a Serving Cell Operating in FDD.

A DAI field can be added to a DCI that is transmitted in a serving cell operating in FDD. Accordingly, when a serving cell operating in FDD and a serving cell operating in TDD have a constant frequency band, the same DCI formats on which the two serving cells are scheduled can be made to have the same size. In this case, UE can use the same searching space when searching for a PDCCH although the UE uses different types of radio frames in the serving cells. If the DCI formats do not have the same size although a DAI field is added (e.g., the DCI formats may not have the same size because frequency bands between the two serving cells differ), the DCI formats can be made to have the same size by adding padding bits.

Or, a DAI field can be added to some of DCIs transmitted in serving cells that operate in FDD. For example, a DAI field can be added to only the DCI formats 0/1A.

The DAI field added as described above can be used for other purposes not for the original use. For example, a DAI field is not basically present in a PDCCH on which an uplink grant for scheduling a primary cell operating in FDD is carried, but if a DAI is included in the PDCCH, the PDCCH can carry information necessary when ACK/NACK is piggybacked to a PUSCH as in TDD. This method can be applied to Method 2.

2. Removing a DAI Field in the DCI of a Serving Cell Operating in TDD.

A DAI field is basically present in a DCI transmitted in a serving cell operating in TDD, but this DAI field can be removed. In this case, when a serving cell operating in FDD and a serving cell operating in TDD have a constant frequency band size, the same DCI formats on which the two serving cells are scheduled can be made to have the same size. In this case, UE can use the same searching space when searching for a PDCCH although the UE uses different types of radio frames in the serving cells. If the DCI formats do not have the same size although the DAI field is added (e.g., for a reason, such as that the frequency bands of the two serving cells do not have the same size), the DCI formats can be made to have the same size by adding padding bits to a DCI format having a smaller size. This method can be applied to Method 1.

As described in the 1 and 2, assuming that a downlink grant for performing scheduling on the downlink data of a primary cell is called a first downlink grant and a downlink grant for performing scheduling on the downlink data of a secondary cell is called a second downlink grant, the number of bits of the first downlink grant can be configured to be the same as that of the second downlink grant.

Figure 15:
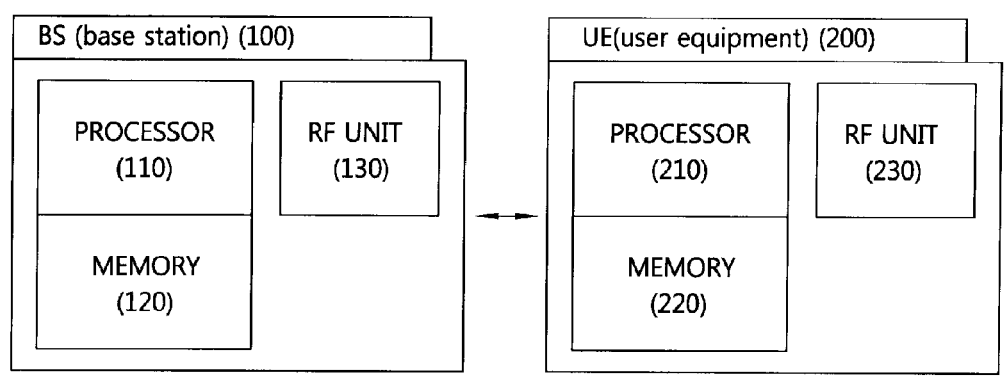
FIG. 15 is a block diagram showing a wireless device in which an embodiment of the present invention is implemented.

FIG. 15 is a block diagram showing a wireless device in which an embodiment of the present invention is implemented.

A BS 100 includes a processor 110, memory 120, and a Radio Frequency (RF) unit 130. The processor 110 implements the proposed functions, processes and/or methods. For example, the processor 110 sends information about the UL-DL configuration of a secondary cell and sends data to UE through a primary cell or a secondary cell. Furthermore, the processor 110 receives ACK/NACK for the data in a subframe configured in a primary cell. This method has been described with reference to FIGS. 10 to 14. The memory 120 is connected to the processor 110, and it stores various pieces of information for driving the processor 110. The RF unit 130 is connected to the processor 110, and it sends and/or receives radio signals.

UE 200 includes a processor 210, memory 220, and an RF unit 230. The processor 210 implements the proposed functions, processes and/or methods. For example, the processor 210 receives information about the UL-DL configuration of a secondary cell from a BS and receives data through a primary cell or a secondary cell. Thereafter, the processor 210 sends ACK/NACK for the data in accordance with the methods described with reference to FIGS. 10 to 14 in a primary cell. The memory 220 is connected to the processor 210, and it stores various pieces of information for driving the processor 210. The RF unit 230 is connected to the processor 210, and it sends and/or receives radio signals.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

Although the some embodiments of the present invention have been described above, a person having ordinary skill in the art will appreciate that the present invention may be modified and changed in various ways without departing from the technical spirit and scope of the present invention. Accordingly, the present invention is not limited to the embodiments and it may be said that the present invention includes all embodiments within the scope of the claims below.

What is claimed is:

1. A method for transmitting acknowledgement/not-acknowledgement (ACK/NACK) information, the method performed by a user equipment (UE) and comprising:
    receiving data in a subframe n of a secondary cell, wherein n is an integer;
    receiving other data in a subframe n of a third cell;
    transmitting ACK/NACK information for the data and ACK/NACK information for the other data in a subframe n+k of a primary cell, wherein k is a natural number,
    wherein the third cell is another secondary cell allocated to the UE in addition to the primary cell and the secondary cell,
    wherein the third cell uses a time division duplex (TDD) frame structure type, and
    wherein when the primary cell and the secondary cell use different frame structure types from each other, k is dependent on a frame structure type of the primary cell.

2. The method of claim 1, wherein when the primary cell uses a Frequency Division Duplex frame structure type, k is determined by an ACK/NACK timing in the primary cell.

3. The method of claim 2, wherein k is 4.

4. The method of claim 1, wherein the secondary cell uses a Time Division Duplex frame structure type.

5. A User Equipment (UE), comprising:
    a Radio Frequency (RF) unit that transmits and receives radio signals; and
    a processor connected to the RF unit,
    wherein the processor controls the RF unit to receive data in a subframe n of a secondary cell, wherein n is an integer, to receive other data in a subframe n of a third cell, and to transmit ACK/NACK information for the data and ACK/NACK information for the other data in a subframe n+k of a primary cell, wherein k is a natural number,
    wherein the third cell is another secondary cell allocated to the UE in addition to the primary cell and the secondary cell,
    wherein the third cell uses a time division duplex (TDD) frame structure type, and
    wherein when the primary cell and the secondary cell use different frame structure types from each other, k is dependent on a frame structure type of the primary cell.

6. The UE of claim 5, wherein when the primary cell uses a Frequency Division Duplex frame structure type, k is determined by an ACK/NACK timing in the primary cell.

7. The UE of claim 6, wherein k is 4.

8. The UE of claim 5, wherein the secondary cell uses a Time Division Duplex frame structure type.

* * * * *